US012791827B2

(12) United States Patent
Hsu

(10) Patent No.: US 12,791,827 B2
(45) Date of Patent: Nov. 10, 2026

(54) CAMERA MODULE

(71) Applicant: Actutek Corporation, Taoyuan City (TW)

(72) Inventor: Chen-Er Hsu, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 39 days.

(21) Appl. No.: 18/647,373

(22) Filed: Apr. 26, 2024

(65) Prior Publication Data

US 2024/0272401 A1 Aug. 15, 2024

Related U.S. Application Data

(63) Continuation of application No. 16/812,974, filed on Mar. 9, 2020, now abandoned, which is a
(Continued)

(30) Foreign Application Priority Data

Dec. 8, 2016 (TW) ................................ 105140588

(51) Int. Cl.
*G02B 7/10* (2021.01)
*G02B 7/02* (2021.01)
(Continued)

(52) U.S. Cl.
CPC ............... *G02B 7/10* (2013.01); *G02B 7/021* (2013.01); *G02B 7/026* (2013.01); *G02B 7/09* (2013.01);
(Continued)

(58) Field of Classification Search
CPC .......... G02B 7/10; G02B 7/021; G02B 7/026; G02B 7/09; H04N 5/2257; H04N 5/2254; H04N 5/2253; G03B 17/02; G03B 17/12
See application file for complete search history.

(56) References Cited

U.S. PATENT DOCUMENTS

| | | | |
|---|---|---|---|
| 9,106,819 | B1 | 8/2015 | Gao et al. |
| 2014/0247389 | A1 | 9/2014 | Lee |
| 2017/0142308 | A1 | 5/2017 | Wang et al. |

FOREIGN PATENT DOCUMENTS

| | | | |
|---|---|---|---|
| CN | 105356714 | A | 2/2016 |
| TW | 201351012 | A | 12/2013 |
| TW | 201636720 | A | 10/2016 |

OTHER PUBLICATIONS

Taiwanese Office Action of corresponding TW Application No. 105140588 dated Feb. 15, 2017, 6 pages.

*Primary Examiner* — Jack Dinh

(74) *Attorney, Agent, or Firm* — MUNCY, GEISSLER, OLDS & LOWE, P.C.

(57) ABSTRACT

A camera module is provided, including a lens holder, a driving mechanism, a frame, a base, a sensing element, and a plurality of three-dimensional circuits. The lens holder carries a lens with an optical axis. The driving mechanism is configured to drive the lens holder along the optical axis. The frame receives the driving mechanism and the lens holder therein. The base supports the frame, and a recess is formed on the bottom of the base. Specifically, the recess is formed by the outer periphery of the bottom of the base extending toward the light-exit direction of the optical axis. The sensing element is disposed in the recess. The three-dimensional circuits are formed in the recess and electrically connected to the sensing element and the driving mechanism.

15 Claims, 9 Drawing Sheets

Related U.S. Application Data continuation of application No. 15/711,358, filed on Sep. 21, 2017, now Pat. No. 10,620,397.

(51) Int. Cl.

| | |
|---|---|
| ***G02B 7/09*** | (2021.01) |
| ***G03B 17/02*** | (2021.01) |
| ***G03B 17/12*** | (2021.01) |
| ***H04N 23/54*** | (2023.01) |
| ***H04N 23/55*** | (2023.01) |
| ***H04N 23/57*** | (2023.01) |

(52) U.S. Cl.

CPC ............. *G03B 17/02* (2013.01); *H04N 23/54* (2023.01); *H04N 23/55* (2023.01); *H04N 23/57* (2023.01); *G03B 17/12* (2013.01); *G03B 2205/0069* (2013.01)

CAMERA MODULE

CROSS REFERENCE TO RELATED APPLICATIONS

This application is a Continuation of application Ser. No. 16/812,974 filed on Mar. 9, 2020, which is Continuation of application Ser. No. 15/711,358 filed on Sep. 21, 2017, which claims priority of Taiwan Patent Application No. 105140588, filed on Dec. 8, 2016, the entirety of which is incorporated by reference herein.

BACKGROUND OF THE INVENTION

Field of the Invention

The invention relates to a camera module, and more particularly to a camera module that can be miniaturized.

Description of the Related Art

With the trend of miniaturization of camera modules, many handheld devices such as mobile phones and tablet PCs have a built-in camera.

FIG. 1A is a perspective view of a conventional camera module 1, and FIG. 1B is a cross-sectional view of the conventional camera module 1 in FIG. 1A from a viewing angle. As shown in FIGS. 1A and 1B, the conventional camera module 1 includes a lens driving module 12 and an image sensing module 14. The lens driving module 12 is a Voice Coil Motor (VCM), which carries a lens 16 and can move the lens 16 back and forth along an image-capturing optical axis O (parallel to the Z-axis in the figures) by means of a coil, magnets, and a spring sheet, thereby achieving automatic focusing or zooming. The image sensing module 14 includes a circuit board 18 such as a Flexible Printed Circuit (FPC) board, a sensing element 20 such as a Charge-Coupled Device (CCD) mounted on the circuit board 18, and a shielding member 22. The sensing element 20 can receive a light signal and convert the light signal into an electronic signal. After processing the electronic signal through a circuit system on the circuit board 18, a digital image can be generated. The shielding member 22 is provided between the lens driving module 12 and the circuit board 18 for protecting the sensing element 20.

It should be understood that the use of the shielding member 22 may affect the miniaturization of the conventional camera module 1, for example, its height cannot be reduced further. In addition, in the current design (see FIG. 1B), some connecting pins 24 are used to pass through the base 26 of the lens driving module 12 to electrically connect the circuit board 18 and the circuits (not shown) in the lens driving module 12. However, in order to prevent the connecting pins 24 from easily separating from the base 26, some features such as engagement structures may have to be provided on the base 26 to hold the connecting pins 24. As a result, the thickness of the base 26 (made of a plastic material) is increased, and the overall height and the production cost of the conventional camera module 1 are also increased.

BRIEF SUMMARY OF THE INVENTION

In view of the aforementioned problems, an object of the invention is to provide a camera module which omits use of the shielding member and connecting pins. Therefore, the production cost of the camera module is reduced and it can be miniaturized further.

An embodiment of the invention provides a camera module, including a lens holder, a driving mechanism, a frame, a base, a sensing element, and multiple three-dimensional circuits. The lens holder carries a lens with an optical axis. The driving mechanism is configured to drive the lens holder along the optical axis. The frame receives the driving mechanism and the lens holder therein. The base supports the frame, and a recess is formed on the bottom of the base. Specifically, the recess is formed by the outer periphery of the bottom of the base extending toward a light-exit direction of the optical axis. The sensing element is disposed in the recess. The three-dimensional circuits are formed in the recess and electrically connected to the sensing element and the driving mechanism.

In some embodiments, the driving mechanism includes a driving coil and multiple driving magnets. The driving coil is disposed on the outer peripheral surface of the lens holder, and the driving magnets are fixed in the frame and adjacent to the driving coil.

In some embodiments, the three-dimensional circuits are electrically connected to the sensing element and the driving coil.

In some embodiments, the three-dimensional circuits pass through the base to electrically connect to the driving coil.

In some embodiments, the recess of the base has a top surface and multiple side surfaces parallel to the optical axis, and the three-dimensional circuits are formed on at least one of the top surface and the side surfaces.

In some embodiments, the camera module further includes multiple electronic components disposed on at least one of the top surface and the side surfaces of the recess and electrically connected to the three-dimensional circuits.

In some embodiments, the electronic components are welded to the three-dimensional circuits.

In some embodiments, the camera module further includes a circuit board. The sensing element is mounted on the circuit board, and the circuit board is electrically connected to the three-dimensional circuits.

In some embodiments, the positions of the electronic components and the sensing element overlap when viewed along the optical axis.

In some embodiments, the sensing element is directly disposed on the top surface of the recess and electrically connected to the three-dimensional circuits.

In some embodiments, the sensing element is welded to the three-dimensional circuits.

In some embodiments, the positions of the electronic components and the sensing element overlap when viewed along the optical axis.

In some embodiments, the three-dimensional circuits are formed in the recess by an insert molding technique or a molded interconnect device technique.

In some embodiments, the molded interconnect device technique comprises Laser Direct Structuring or Micro-Integrated-Processing Technology (MIPTEC).

In some embodiments, the camera module further includes a spring sheet connected to the lens holder and the frame.

In some embodiments, the camera module further includes a spring sheet connected to the lens holder and the base.

In some embodiments, the camera module further includes a spring sheet connected to the lens holder and the frame and another spring sheet connected to the lens holder and the base.

In some embodiments, the outer periphery of the bottom of the base is joined to the circuit board.

In some embodiments, the outer periphery of the bottom of the base and the circuit board have a single joining surface therebetween.

In some embodiments, the recess is formed between the bottom of the base and the outer periphery extending therefrom.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
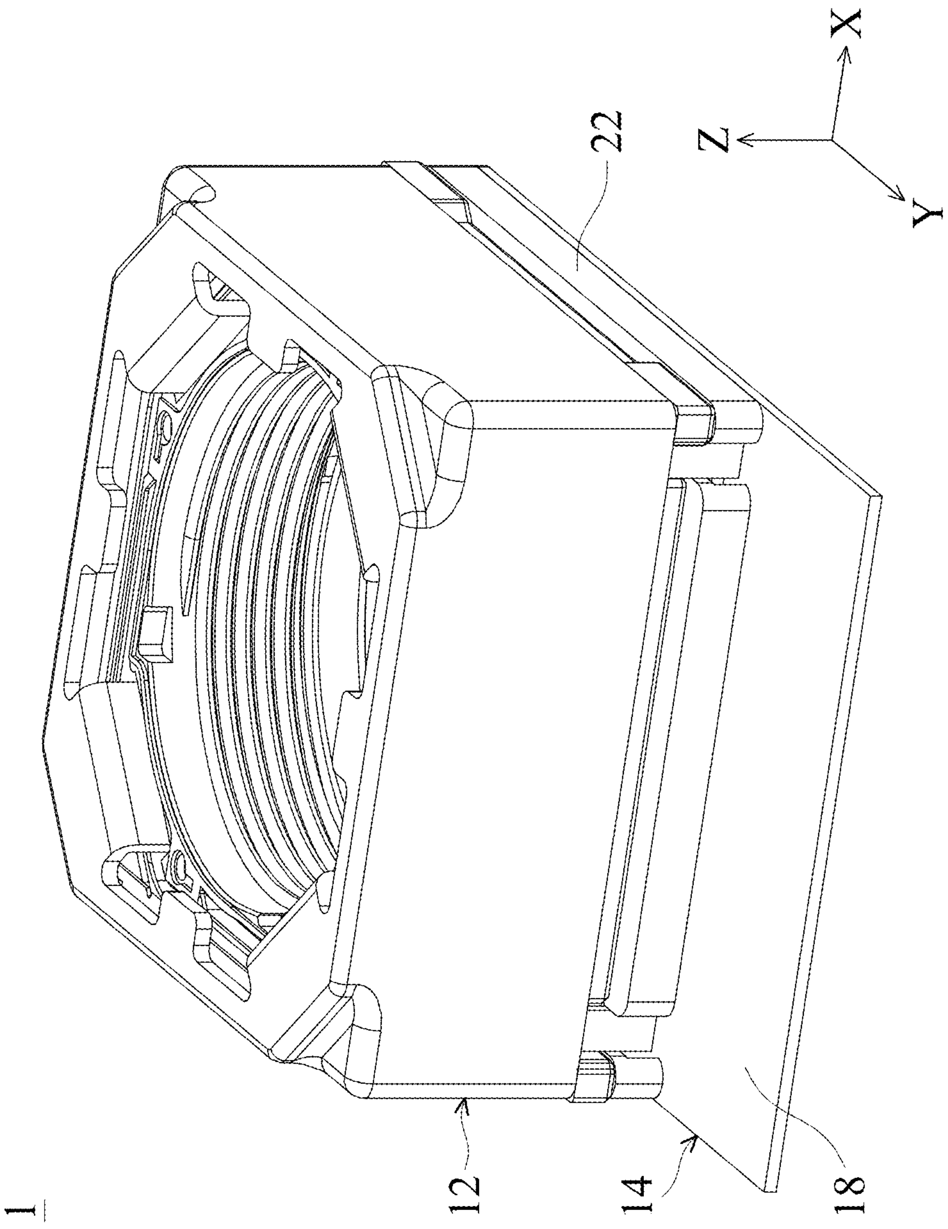
FIG. 1A ( PRIOR ART )
FIG. 1A is a perspective view of a conventional camera module.

The following description is of the best-contemplated mode of carrying out the invention. This description is made for the purpose of illustrating the general principles of the invention and should not be taken in a limiting sense. The scope of the invention is best determined by reference to the appended claims.

In the following detailed description, the orientations of "on", "above", "under", and "below" are used for representing the relationship between the relative positions of each element as illustrated in the drawings, and are not meant to limit the invention. Moreover, the formation of a first element on or above a second element in the description that follows may include embodiments in which the first and second elements are formed in direct contact, or the first and second elements have one or more additional elements formed therebetween.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, some elements not shown or described in the embodiments have the forms known by persons skilled in the field of the invention.

Figure 2A:
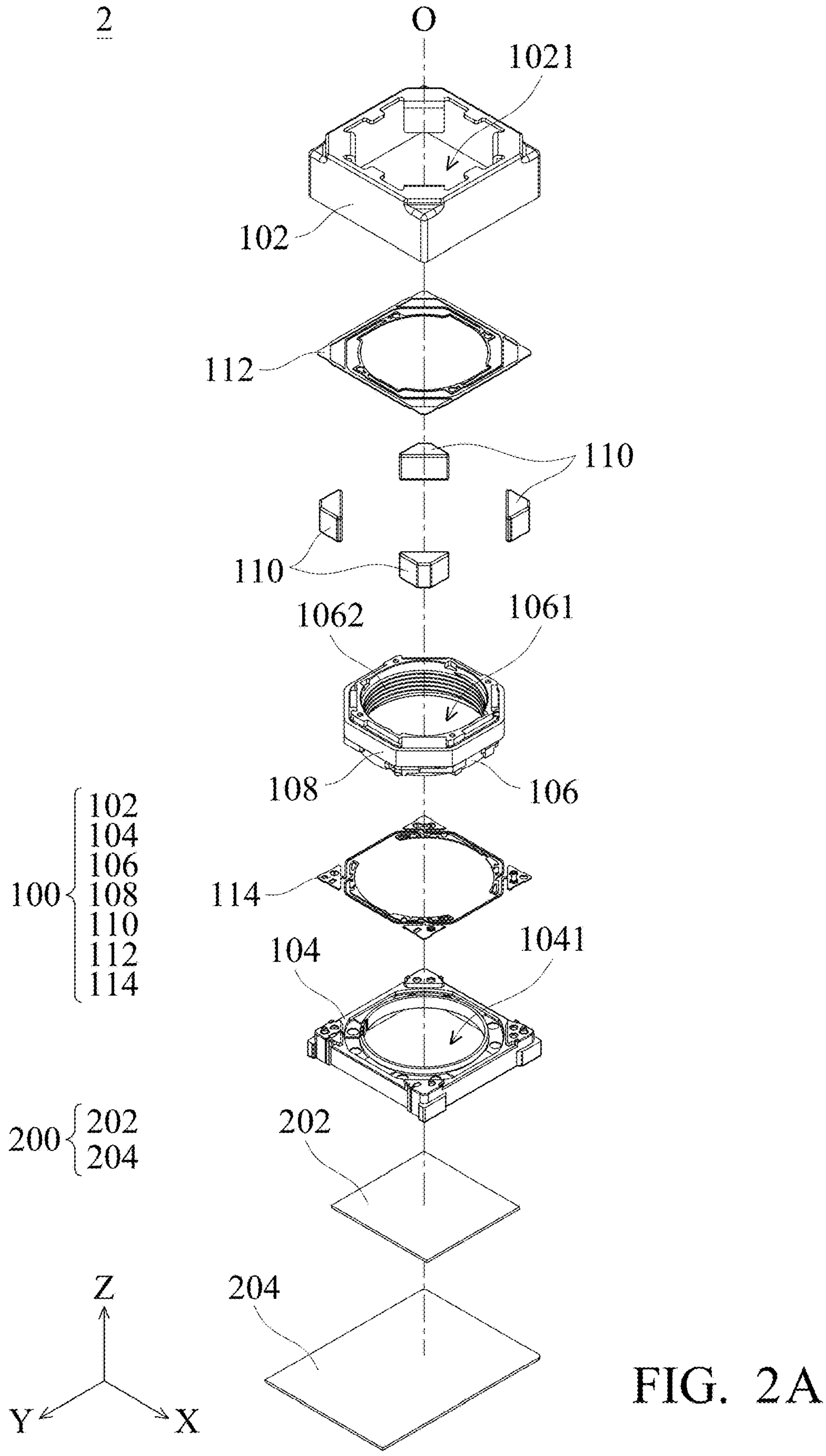
FIG. 2A is an exploded view of a camera module in accordance with an embodiment of the invention.
Figure 2B:
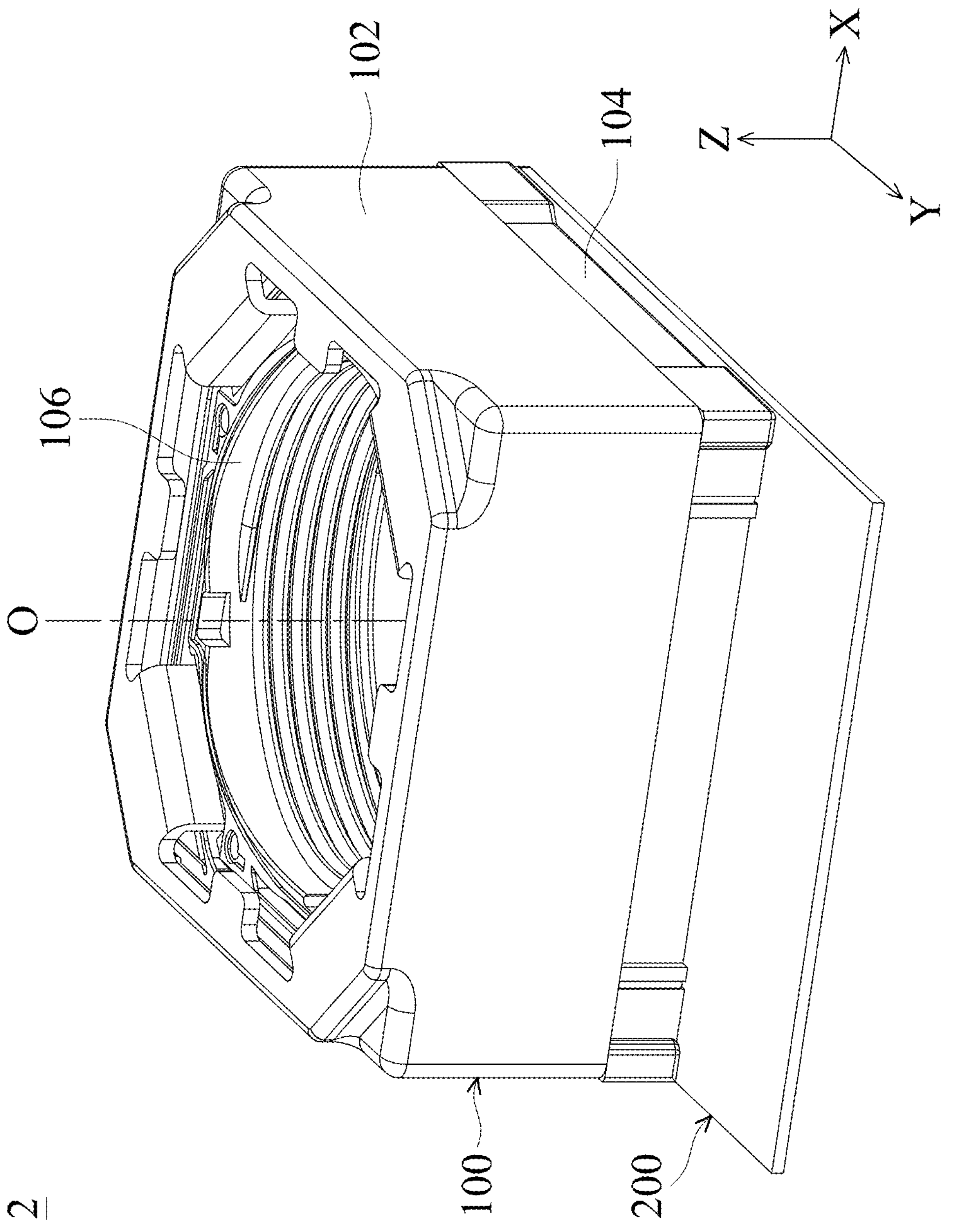
FIG. 2B is a schematic view of the camera module in FIG. 2A after assembly.

FIG. 2A is an exploded view of a camera module 2 in accordance with an embodiment of the invention, and FIG. 2B is a schematic view of the camera module 2 in FIG. 2A after assembly. As shown in FIGS. 2A and 2B, the camera module 2 includes a lens driving module 100 and an image sensing module 200. The lens driving module 100 may be a Voice Coil Motor (VCM), which defines three axial directions that are perpendicular to each other, namely the X-axis direction, Y-axis direction, and Z-axis direction, and includes a lens (not shown), a frame 102, a base 104, a lens holder 106, a driving coil 108, four driving magnets 110, an upper spring sheet 112, and a lower spring sheet 114. The image sensing module 200 includes a sensing element 202 (such as a CCD or a Complementary Metal-Oxide-Semiconductor (CMOS) and a circuit board 204 (such as an FPC board).

In this embodiment, the frame 102 has a cubic appearance and the bottom thereof is open (this cannot be seen in FIG. 2A due to the restricted viewing angle). The frame 102 and the (square) base 104 can be combined (for example, through engagement structures or by means of adhesion) to form a housing of the lens driving module 100. More specifically, the base 104 supports the frame 102 from below, and the other components of the lens driving module 100 described above are received in the frame 102.

In addition, a frame opening 1021 and a base opening 1041 are respectively formed on the top wall of the frame 102 and the base 104. The centers of the frame opening 1021 and the base opening 1041 are located on an (image-capturing) optical axis O (parallel to the Z-axis) of the lens (not shown) in the lens driving module 100, and the base opening 1041 faces the sensing element 202 mounted on the circuit board 204 below it. Thus, the lens in the lens driving module 100 can capture light from the outside through the frame opening 1021 of the frame 102. Moreover, the sensing element 202 can receive a light signal from the lens through the base opening 1041 of the base 104 and convert the light signal into an electronic signal. Then, the electronic signal can be processed through a circuit system on the circuit board 204 to generate a digital image.

The lens holder 106 is used to carry the lens (not shown). In this embodiment, the lens holder 106 is a hollow octagonal structure and has a through hole 1061, wherein the through hole 1061 forms a thread structure 1062 corresponding to another thread structure on the outer peripheral surface of the lens, such that the lens can be locked in the through hole 1061.

The driving coil 108 is disposed on (e.g. wound around) the outer peripheral surface of the lens holder 106. In this embodiment, the driving coil 108 conforms to the shape of the lens holder 106 and has an octagonal ring shape, but the invention is not limited to these shapes. The lens holder 106 and the driving coil 108 may also be designed in other shapes as desired.

The four driving magnets 110 are, for example, permanent magnets fixed in the frame 102 and adjacent to the outside of the driving coil 108. In this embodiment, the four driving magnets 110 are triangular and affixed to the four respective corners of the frame 102, but the invention is not limited thereto. In some embodiments, the four driving magnets 110 may also be elongated and respectively disposed inside the four side walls of the frame 102.

Moreover, the lens holder 106 is movably disposed in the frame 102. More specifically, the lens holder 106 can be elastically suspended in the center of the frame 102 by the upper spring sheet 112 and the lower spring sheet 114, and carries the lens (not shown) to move back and forth along the optical axis O. In this embodiment, the upper spring sheet 112 is an elastic metal sheet having thin reticulated structures, and is disposed on one side of the lens holder 106 close to the top wall of the frame 102, and is connected between the lens holder 106 (movable part) and the frame 102 (fixed part). The lower spring sheet 114 is also an elastic metal sheet having thin reticulated structures, and is disposed on one side of the lens holder 106 close to the base 104, and is connected between the lens holder 106 (movable part) and the base 104 (fixed part). In some embodiments, the upper spring sheet 112 or the lower spring sheet 114 may also be omitted, and the lens holder 106 is elastically suspended in the center of the frame 102 by a single spring sheet.

With the above configuration, as a current is supplied to the driving coil 108, an electromagnetic force is generated between the driving coil 108 and the driving magnets 110 to drive the lens holder 106 back and forth along the optical axis O (i.e. the driving coil 108 and the driving magnets 110 can be regarded as the driving mechanism of the lens holder 106), so that the focusing between the lens and the sensing element 202 is carried out. Moreover, the upper and lower spring sheets 112 and 114 can limit the range in which the lens holder 106 can be moved along the optical axis O and provide a buffer capacity for the displacement of the lens holder 106 in the X-axis, the Y-axis, and the Z-axis directions.

Figure 3:
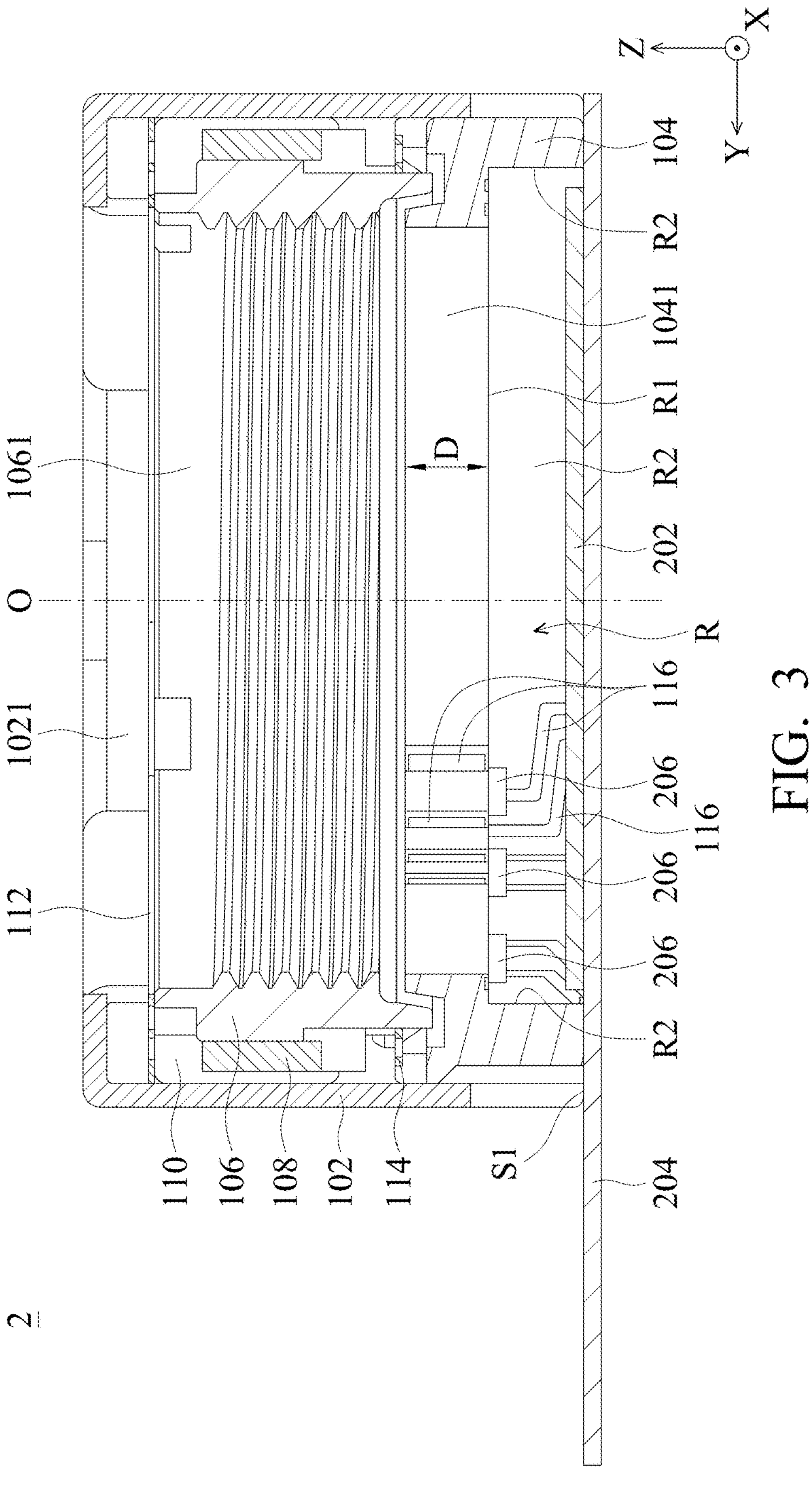
FIG. 3 is a cross-sectional view of the camera module in FIG. 2B from a viewing angle.

FIG. 3 is a cross-sectional view of the camera module 2 in FIG. 2B from a viewing angle. As shown in FIG. 3, in this embodiment, the bottom of the base 104 also has a recess R, which is formed by the outer periphery of the bottom of the base 104 extending toward a light-exit direction (i.e. downward or toward the direction of the sensing element 202) of the optical axis O. More specifically, the recess R is formed between the bottom of the base 104 and its extended outer periphery. In addition, when assembled, the extended outer periphery of the bottom of the base 104 can be joined to the circuit board 204 (for example, by means of adhesion), and the sensing element 202 is correspondingly received in the recess R. Thus, the recess R of the base 104 can protect the sensing element 202 and replace the shielding member 22 (FIGS. 1A and 1B) used in the prior art. In other words, the camera module 2 of this embodiment omits use of the traditional shielding member 22, so that the number of components and the production cost can be reduced.

It should also be noted that the base 104 of the lens driving module 100 of this embodiment can be directly joined to the circuit board 204 of the image sensing module 200 (i.e. only a single joining surface S1 between the base 104 and the circuit board 204) due to the omission of the shielding member 22. In contrast, in a conventional camera module 1 (see FIG. 1B), there are two joining surfaces (including the joining surface S2 between the base 26 and the shielding member 22 and the joining surface S3 between the shielding member 22 and the circuit board 18) between the base 26 of the lens driving module 12 and the circuit board 18 of the image sensing module 14. Compared to the conventional camera module 1, the camera module 2 of this embodiment has fewer joining surfaces, so that the tolerance of the joining surfaces existing between different components can be reduced. As a result, the tilt condition of the mechanism of the camera module 2 can be improved (i.e. the manufacturing quality of the camera module 2 can be improved).

As shown in FIG. 3, multiple three-dimensional circuits 116 are also formed in the recess R of the bottom of the base 104. More specifically, the recess R has a top surface R1 and multiple side surfaces R2 parallel to the optical axis O (i.e. parallel to the Z-axis), and the three-dimensional circuits 116 may be formed on at least one of the top surface R1 and the side surfaces R2. In this embodiment, the three-dimensional circuits 116 are formed on the top surface R1 and only one of the side surfaces R2, but the invention is not limited thereto. In some embodiments, the three-dimensional circuits 116 may also be formed on the side surfaces R2, according to demand.

In some embodiments, the three-dimensional circuits 116 may be formed in the recess R (i.e. formed on at least one of the top surface R1 and the side surfaces R2) by an insert molding technique or a molded interconnect device technique (referring to a technique of forming a conductive circuit on a three-dimensional surface of a non-conductive plastic film element, such as Laser Direct Structuring or Micro-Integrated-Processing Technology (MIPTEC)).

Moreover, as shown in FIG. 3, the three-dimensional circuits 116 formed on the side surface R2 are extended and electrically connected to the circuit board 204 and the sensing element 202 thereon, and the three-dimensional circuits 116 formed on the top surface R1 are extended and passing through the base 104 to electrically connect to the driving coil 108 (driving mechanism) in the frame 102. In this embodiment, the three-dimensional circuits 116 passing through the base 104 may also electrically connect the driving coil 108 through the lower spring sheet 114 and some wires (not shown). Thus, the electrical connection between the circuits (including the driving coil 108, the lower spring sheet 114, and the wires, which are not shown) in the lens driving module 100 and the circuit board 204 of the image sensing module 200 can be achieved without using the connecting pins 24 (FIG. 1B) of the prior art. Consequently, the thickness D of the base 104 made of a plastic material can be reduced, and the production cost and the overall height of the camera module 2 can also be reduced (which is beneficial for the miniaturization of the camera module 2).

Furthermore, in this embodiment, multiple electronic components 206 (such as resistors, inductors, and other active/passive components) originally mounted on the circuit board 204 may also be disposed in the recess R, such as on the top surface R1 of the recess R, and electrically connected to the three-dimensional circuits 116 (i.e. welded to the three-dimensional circuits 116). Alternatively, the electronic components 206 may also be disposed on at least one side surface R2 (see FIG. 5) of the recess R in some embodiments.

Figure 1B:
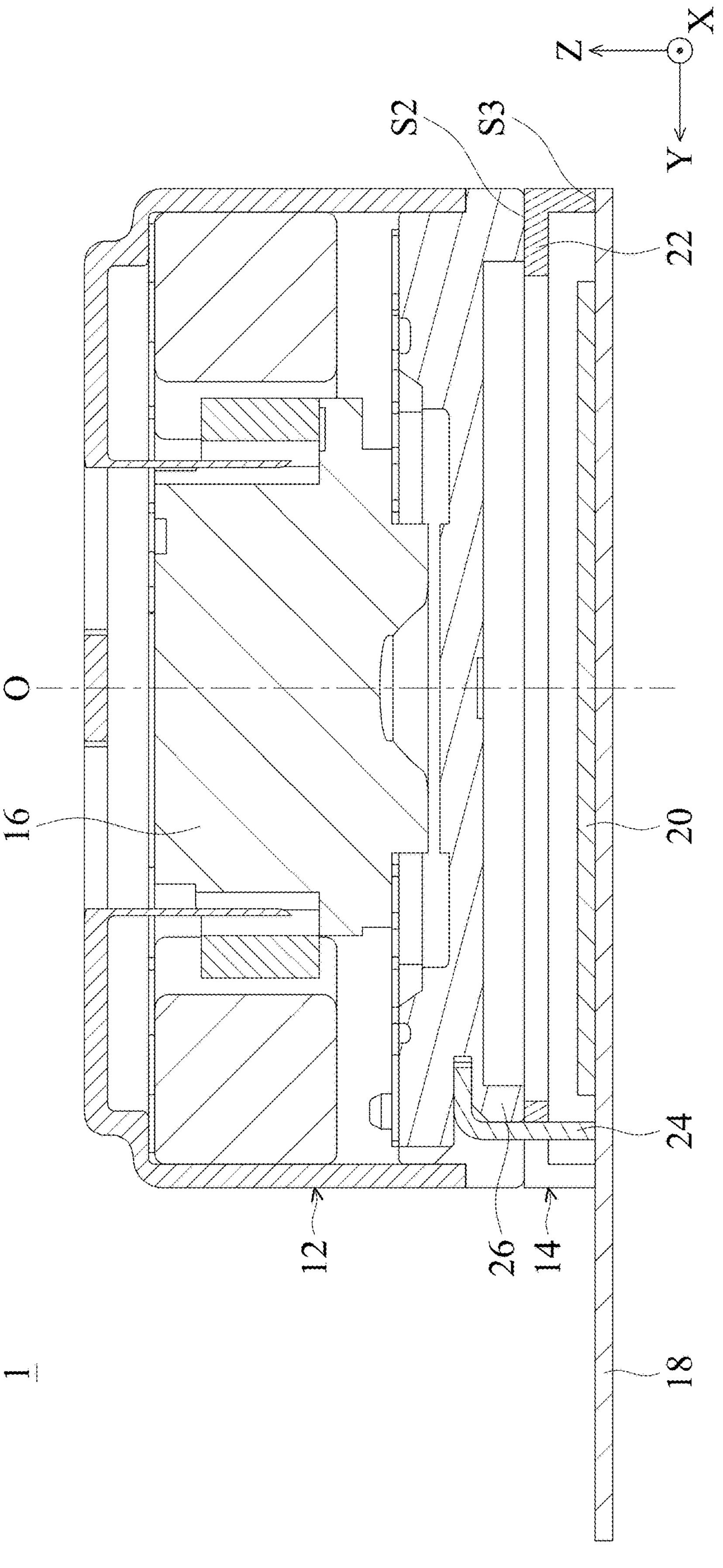
FIG. 1B ( PRIOR ART )
FIG. 1B is a cross-sectional view of the conventional camera module in FIG. 1A from a viewing angle.
Figure 1C:
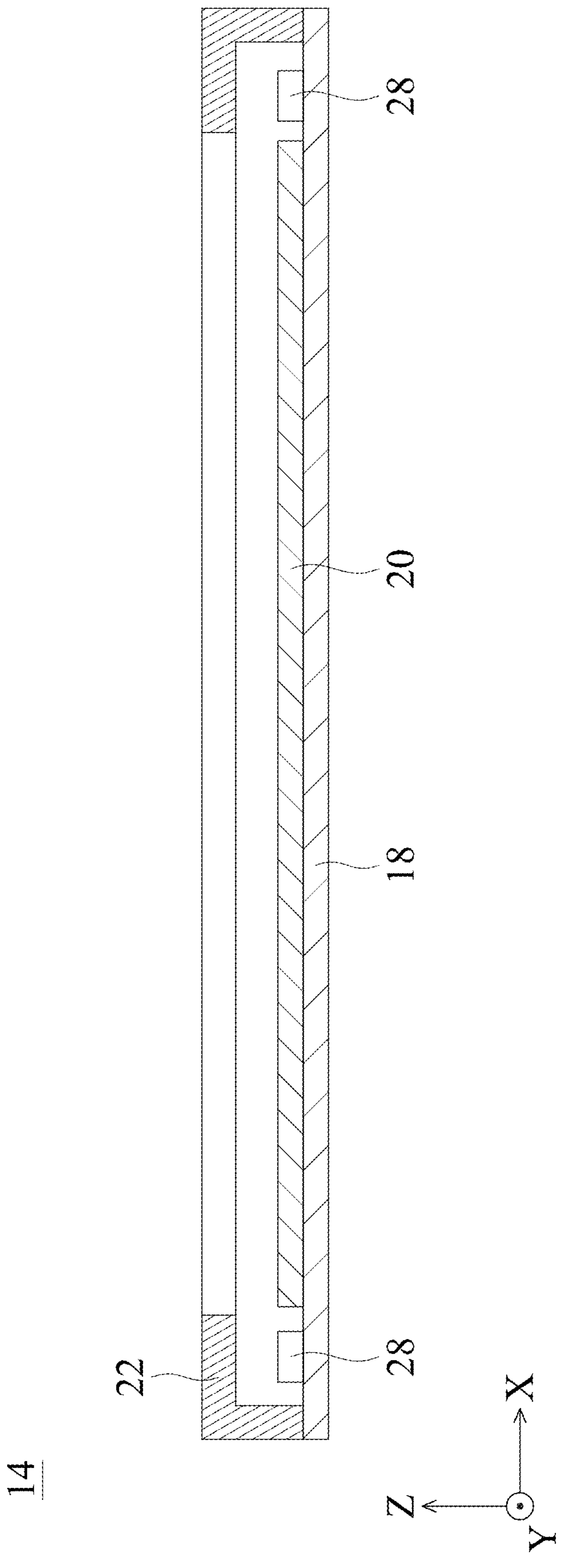
FIG. 1C ( PRIOR ART )
FIG. 1C is a cross-sectional view of the image sensing module in FIG. 1A from a viewing angle.
Figure 1D:
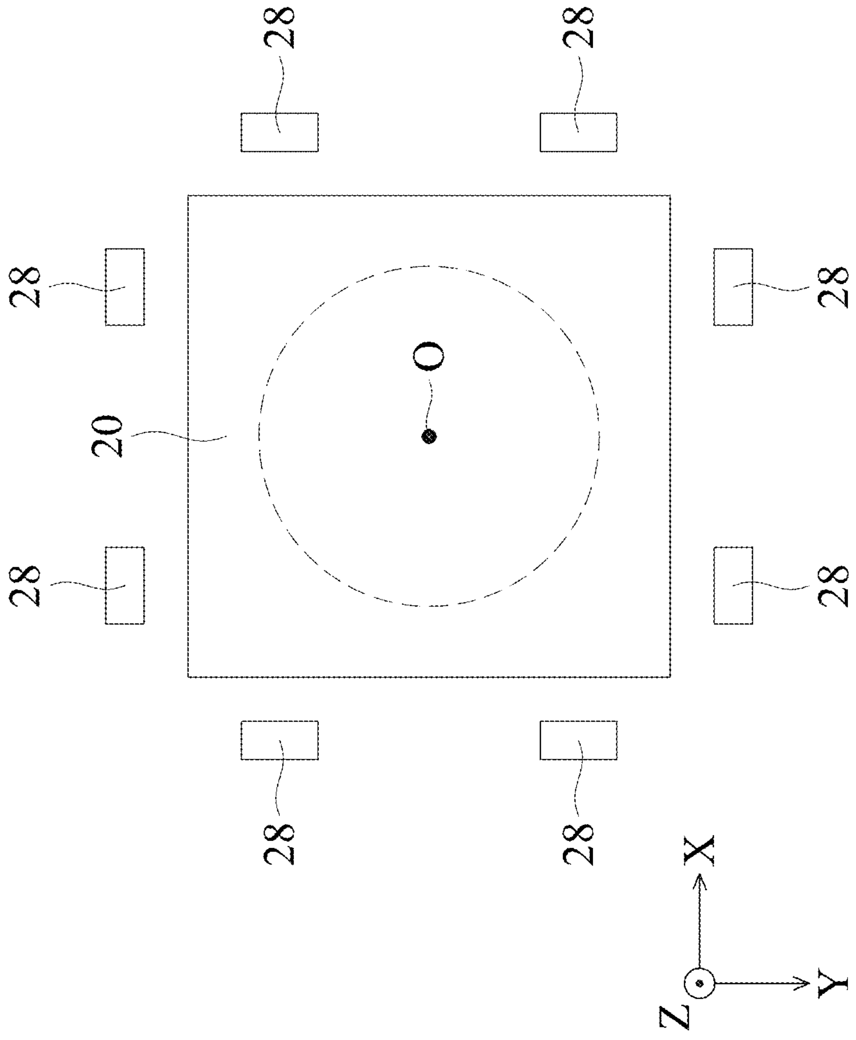
FIG. 1D ( PRIOR ART )
FIG. 1D is a schematic view of the sensing element and electronic components in FIG. 1C when viewed along the optical axis.
Figure 4:
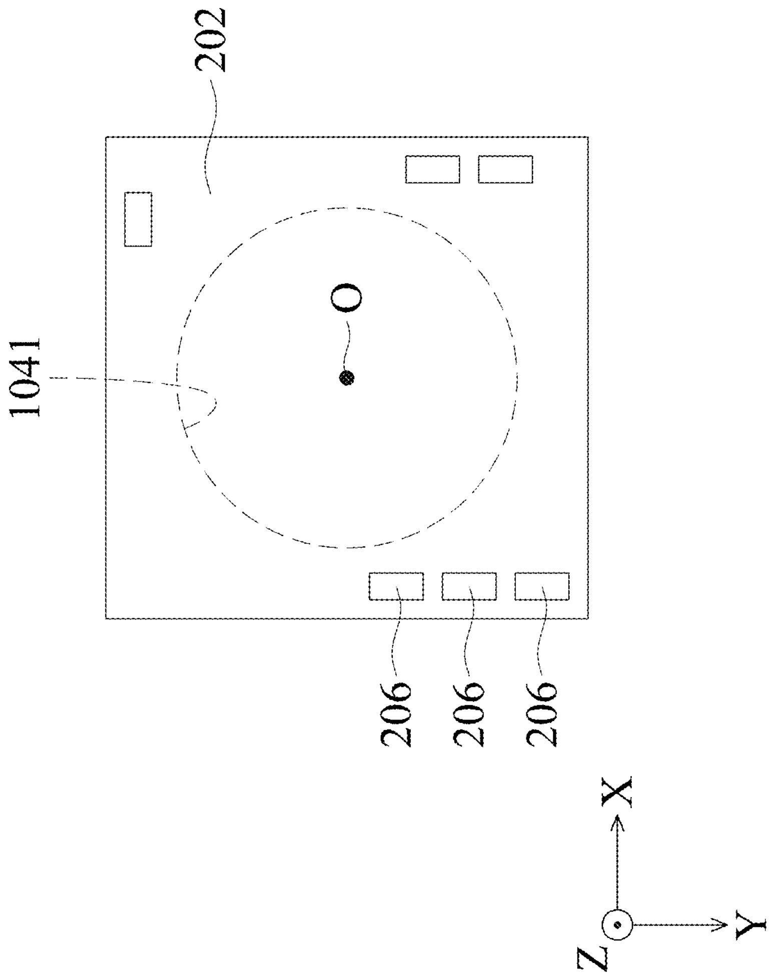
FIG. 4 is a schematic view of the sensing element and electronic components in FIG. 3 when viewed along the optical axis.

Referring to FIGS. 1C, 1D, 3 and 4, wherein FIG. 1C is a cross-sectional view of the image sensing module 14 in FIG. 1A from a viewing angle, FIG. 1D is a schematic view of the sensing element 20 and electronic components 28 in FIG. 1C when viewed along the optical axis O, and FIG. 4 is a schematic view of the sensing element 202 and electronic components 206 in FIG. 3 when viewed along the optical axis O. In the prior art (FIGS. 1C and 1D), the sensing element 20 and electronic components 28 are mounted on the circuit board 18 side by side (i.e. the positions of the sensing element 20 and electronic components 28 do not overlap when viewed along the optical axis O). As a result, the circuit board 18 carrying the sensing element 20 and electronic components 28 is required to have a certain area size, such that the size of the image sensing module 14 and the entire conventional camera module 1 (FIG. 1A) cannot be reduced. Conversely, in this embodiment (FIGS. 3 and 4), some electronic components 206 originally mounted on the circuit board 204 are disposed on the top surface R1 (i.e. the positions of the sensing element 202 and the electronic components 206 overlap when viewed along the optical axis O) of the recess R instead. Therefore, the area of the circuit board 204 can be reduced, thereby facilitating the miniaturization of the camera module 2 and reducing the production cost.

Figure 5:
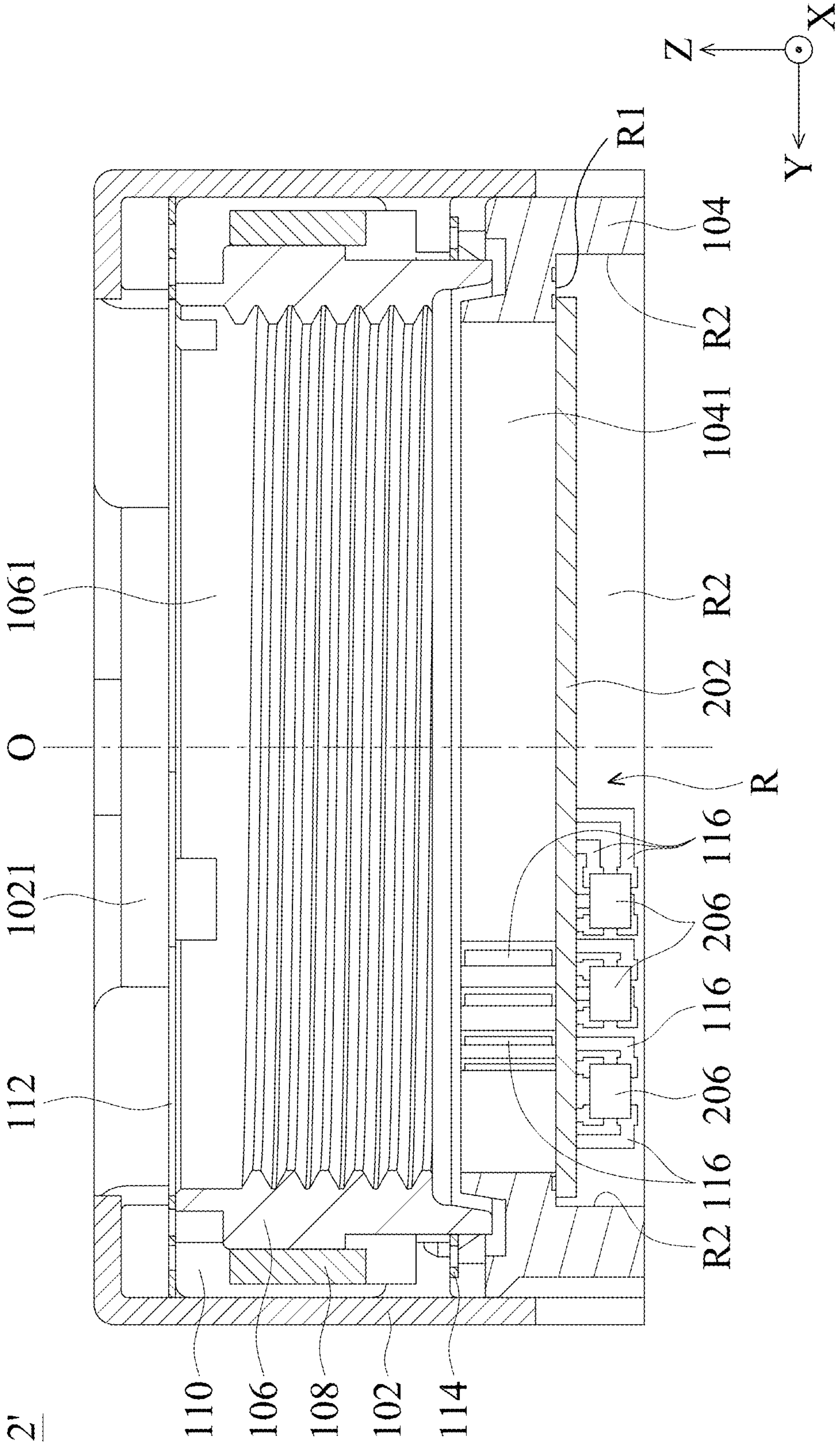
FIG. 5 is a cross-sectional view of a camera module in accordance with another embodiment of the invention from a viewing angle.

FIG. 5 is a cross-sectional view of a camera module 2' in accordance with another embodiment of the invention from a viewing angle. It should be realized that the camera module 2' differs from the camera module 2 of the above embodiment mainly in that the circuit board 204 is omitted and the sensing element 202 is directly disposed on the top surface R1 of the recess R and electrically connected to the three-dimensional circuits 116 (i.e. welded to the three-dimensional circuits 116). Thus, the number of components can be reduced further, the manufacturing process can be simplified, and the production cost and the overall height of the camera module 2' can be reduced (which is beneficial for the miniaturization of the camera module 2'). In addition, the three-dimensional circuits 116 may easily be formed at any position of the recess R by, for example, Laser Direct Structuring, so that it is also easy to adjust the arrangement of the electronic components 206 (for example, from the top surface R1 shown in FIG. 3 to the side surface R2 shown in FIG. 5).

As described above, according to the embodiments of the invention, the recess R on the bottom of the base 104 and the three-dimensional circuits 116 may be used to replace the shielding member and the connecting pins of the prior art, so as to reduce the production cost of the camera module and facilitate the miniaturization of the camera module. Furthermore, the sensing element 202 and the electronic components 206 of the image sensing module 200 may also be directly disposed in the recess R of the base through the three-dimensional circuits 116, and the circuit board 204 may be omitted. Therefore, the manufacturing process can be simplified, and the production cost and the size of the entire camera module can be reduced.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera module, comprising:

a base, wherein a bottom of the base has a recess, and the recess is formed by an outer periphery of the bottom and extends toward a light-exit direction of an optical axis;

a plurality of three-dimensional circuits, formed on a top surface of the recess by an insert molding technique or a molded interconnect device technique; and a sensing element, directly connected to the top surface of the recess and electrically connected to the three-dimensional circuits, wherein the top surface faces the light-exit direction.

2. The camera module as claimed in claim 1, wherein the top surface of the recess is perpendicular to the optical axis.

3. The camera module as claimed in claim 1, further comprising a plurality of electronic components, wherein the three-dimensional circuits are partially on a side surface of the recess, wherein the electronic components are welded to the three-dimensional circuits on the side surface of the recess, and wherein the welding direction to the three-dimensional circuits on the side surface of the recess is perpendicular to the light-exit direction.

4. The camera module as claimed in claim 3, wherein the side surface of the recess is parallel to an optical axis.

5. The camera module as claimed in claim 3, wherein the sensing element is received in the recess, and wherein the sensing element and the electronic components are disposed in sequence along the light-exit direction.

6. The camera module as claimed in claim 3, wherein the side surface of the recess is parallel to the optical axis.

7. The camera module as claimed in claim 1, wherein the recess is passed through by the optical axis.

8. The camera module as claimed in claim 1, wherein the recess is formed between the bottom of the base and the outer periphery.

9. The camera module as claimed in claim 1, wherein positions of the electronic components and the sensing element overlap when viewed along the optical axis.

10. The camera module as claimed in claim 1, further comprising:

a lens holder, carrying a lens with the optical axis;

a driving mechanism, configured to drive the lens holder along the optical axis;

a frame, receiving the driving mechanism and the lens holder therein.

11. The camera module as claimed in claim 10, wherein the driving mechanism includes a driving coil and a plurality of driving magnets, the driving coil being disposed on an outer peripheral surface of the lens holder, and the driving magnets being fixed in the frame and adjacent to the driving coil.

12. The camera module as claimed in claim 11, wherein the three-dimensional circuits are electrically connected to the driving coils.

13. The camera module as claimed in claim 11, wherein the three-dimensional circuits pass through the base to electrically connect to the driving coils.

14. The camera module as claimed in claim 1, further comprising a circuit board, wherein the sensing element is mounted on the circuit board, and the circuit board is electrically connected to the three-dimensional circuits.

15. The camera module as claimed in claim 1, wherein the sensing element is welded to the three-dimensional circuits.

* * * * *